United States Patent
Okaji et al.

(10) Patent No.: US 9,927,014 B2
(45) Date of Patent: Mar. 27, 2018

(54) STATOR STRUCTURE FOR TORQUE CONVERTER

(71) Applicant: HONDA MOTOR CO., LTD., Tokyo (JP)

(72) Inventors: Tomoya Okaji, Wako (JP); Hiroya Abe, Wako (JP); Tomohiko Usui, Wako (JP); Yoshitaka Mishima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 388 days.

(21) Appl. No.: 14/428,799

(22) PCT Filed: Aug. 15, 2013

(86) PCT No.: PCT/JP2013/071960
§ 371 (c)(1),
(2) Date: Mar. 17, 2015

(87) PCT Pub. No.: WO2014/045770
PCT Pub. Date: Mar. 27, 2014

(65) Prior Publication Data
US 2015/0219195 A1    Aug. 6, 2015

(30) Foreign Application Priority Data

Sep. 19, 2012  (JP) ................................. 2012-205804

(51) Int. Cl.
*F16H 41/26* (2006.01)
*F16H 41/24* (2006.01)
(Continued)

(52) U.S. Cl.
CPC ............. *F16H 41/26* (2013.01); *F16H 41/24* (2013.01); *F16H 61/60* (2013.01); *F16H 2041/246* (2013.01); *F16H 2041/285* (2013.01)

(58) Field of Classification Search
CPC .......... F16H 41/26; F16H 41/28; F16H 45/02; F16H 61/60; F16H 2041/246; F16H 2041/285
(Continued)

(56) References Cited

U.S. PATENT DOCUMENTS 2,612,754 A * 10/1952 Swift ...................... F03B 13/00
                                                    60/346
3,797,243 A    3/1974 Trusov
(Continued)

FOREIGN PATENT DOCUMENTS

CN       101245843 A     8/2008
CN       101410655 A     4/2009
(Continued)

OTHER PUBLICATIONS

International Search Report dated Oct. 22, 2013 issued in corresponding application No. PCT/JP2013/071960.
(Continued)

*Primary Examiner* — Thomas E Lazo
*Assistant Examiner* — Michael Quandt
(74) *Attorney, Agent, or Firm* — Westerman, Hattori, Daniels & Adrian, LLP

(57) ABSTRACT

A stator of a torque converter is divided into a first stator on an upstream side and a second stator on a downstream side, and the first and second stators are supported on a fixed part via first and second one-way clutches, respectively. Since, with regard to a blade of the first stator, when viewed in the axis direction, the blade tip part is inclined relative to the blade base part in the disengagement direction of the first one-way clutch, it is possible to ensure the blade area without increasing the dimension in the radial direction and the dimension in the axis direction of the blade of the first stator, and it is possible, by smoothly guiding oil along the
(Continued)

blade of the first stator to thus suppress the occurrence of a vortex, to reduce energy loss in a low speed ratio region where the vortex easily occurs.

2 Claims, 8 Drawing Sheets

(51) Int. Cl.
 *F16H 61/60* (2006.01)
 *F16H 41/28* (2006.01)
(58) Field of Classification Search
 USPC .................................................. 60/345, 346
 See application file for complete search history.

(56) References Cited

U.S. PATENT DOCUMENTS

| | | |
|---|---|---|
| 5,313,793 A | 5/1994 | Kirkwood et al. |
| 6,996,978 B2 | 2/2006 | Goerend |
| 2009/0229937 A1 | 9/2009 | Heeke |
| 2014/0123637 A1 | 5/2014 | Okaji et al. |

FOREIGN PATENT DOCUMENTS

| | | | |
|---|---|---|---|
| DE | 102 48 254 A1 | 4/2004 | |
| JP | 48-17057 | 3/1973 | |
| JP | 62-100365 U | 6/1987 | |
| JP | 6-193704 A | 7/1994 | |
| JP | 2009-209979 A | 9/2009 | |
| JP | 2011-52781 A | 3/2011 | |
| WO | 2012/176803 A1 | 12/2012 | |
| WO | WO 2012176803 A1 * | 12/2012 | ............. F16H 41/26 |

OTHER PUBLICATIONS

Office Action dated Jun. 29, 2016, dated in Chinese Patent Application No. 201380047815.9, with English translation. (10 pages).

\* cited by examiner

CONVENTIONAL EXAMPLE

US 9,927,014 B2

STATOR STRUCTURE FOR TORQUE CONVERTER

TECHNICAL FIELD

The present invention relates to a stator structure for a torque converter in which a stator is divided into a first stator and a second stator, and the first and second stators are supported via one-way clutches so as to be capable of idling independently from each other.

BACKGROUND ART

A torque converter for an automobile includes a pump impeller connected to a crankshaft of an engine, a turbine runner connected to a main shaft of a transmission, and a stator supported on a casing via a one-way clutch, the turbine runner is driven by means of a flow of oil generated by the pump impeller, and the flow of oil that has passed through the turbine runner and been deflected is aligned by means of the stator, thus circulating oil along the pump impeller, the turbine runner, and the stator.

As shown in FIG. 7, an arrangement in which a stator blade 02 of a stator 01 is divided into a first stator blade 02a on the upstream side in the direction of flow of oil and a second stator blade 02b on the downstream side in the direction of flow of oil, and the first stator blade 02a and the second stator blade 02b are supported on a casing by respective one-way clutches so that they can idle independently from each other is known from Patent Document 1 below.

Due to the stator blade 02 being divided into the first stator blade 02a and the second stator blade 02b in this way, the first stator blade 02a is first made to idle in response to an increase in speed ratio, thus allowing the function of the second stator blade 02b in aligning the flow of oil to be exhibited, and accompanying a further increase in the speed ratio both the first stator blade 02a and the second stator blade 02b are made to idle, thus preventing oil flow separation.

RELATED ART DOCUMENTS

Patent Documents

Patent Document 1: Japanese Utility Model Application Laid-open No. 62-100365

SUMMARY OF THE INVENTION

Problems to be Solved by the Invention

However, in the invention described in Patent Document 1 above there is a possibility that, as shown in FIG. 7(A), when the first stator blade 02a is idling and the second stator blade 02b is fixed, in a state in which the position of the first stator blade 02a relative to the second stator blade 02b is displaced by half the blade row pitch, a gap α formed between the trailing edge of the first stator blade 02a and the leading edge of the second stator blade 02b will become extremely small and the flow of oil will be inhibited in the area of the gap α, thus degrading the performance.

Furthermore, the state of flow between the first stator blade 02a and the second stator blade 02b varies greatly between a state in which the relative positions of the first stator blade 02a and the second stator blade 02b are displaced only by a half of the pitch of the blade row (see FIG. 7(A)) and a state in which the first stator blade 02a and the second stator blade 02b are aligned without displacement (see FIG. 7(B)), and as shown in FIG. 8, there is the problem that there are large variations in the torque ratio characteristics and the capacity coefficient characteristics of the torque converter.

Moreover, in recent years, in order to reduce the dimension in the axial direction of the transmission, there is a requirement to reduce the dimension in the axial direction of the torque converter, and as a result the length of the chord (the length from the leading edge to the trailing edge) or the length of the span (the length from the blade base to the blade tip) of the stator blade of the torque converter tends to shorten. In particular, when the first stator blade 02a is made small, if, in a region where the speed ratio is small, an attempt is made to bend high-speed flow from the turbine runner toward the second stator blade 02b by means of the first stator blade 02a having a small blade area, the flow cannot be bent smoothly, a vortex occurs at a blade tip part of the first stator blade 02a, and there is the problem that this causes energy loss.

The present invention has been accomplished in light of the above circumstances, and it is an object thereof to suppress the occurrence of a vortex in a low speed ratio region of a torque converter, thus reducing energy loss.

Means for Solving the Problems

In order to attain the above object, according to a first aspect of the present invention, there is provided a stator structure for a torque converter comprising a pump impeller that is connected to a drive source and rotates around an axis, a turbine runner that is connected to an input shaft of a transmission and rotates around the axis, and a stator that is disposed between the pump impeller and the turbine runner, the stator comprising a first stator that is positioned on an upstream side in a direction of circulation of oil and a second stator that is positioned on a downstream side in the direction of circulation, the first stator being supported on a fixed part via a first one-way clutch, and the second stator being supported on the fixed part via a second one-way clutch, characterized in that when viewed in the axis direction, a blade tip part of a blade of the first stator is inclined in a disengagement direction of the first one-way clutch relative to a blade base part.

Further, according to a second aspect of the present invention, in addition to the first aspect, when the first stator and the second stator are in predetermined phases, a leading edge of the blade of one first stator intersects leading edges of blades of at least two second stators.

Furthermore, according to a third aspect of the present invention, in addition to the first or second aspect, a span length of the blade of the first stator is smaller than a span length of the blade of the second stator.

A main shaft 13 of an embodiment corresponds to the input shaft of the present invention, a torque converter case 38 of the embodiment corresponds to the fixed part of the present invention, a first stator blade 42 of the embodiment corresponds to the blade of the first stator of the present invention, and a second stator blade 46 of the embodiment corresponds to the blade of the second stator of the present invention.

Effects of the Invention

In accordance with the first aspect of the present invention, in a region where the speed ratio of the torque converter is small, the first and second one-way clutches are both engaged, the first and second stators are both restrained on the fixed part, and oil flows along the blades of the first and second stators with its flow aligned in a desired direction. When the direction of flow of oil entering the stator changes accompanying an increase in the speed ratio, since the first one-way clutch is disengaged and the first stator idles to thus prevent the speed of the blade of the first stator from decreasing, oil flows along the second stator blade of the second stator and the flow is aligned in a desired direction. In a region where the speed ratio is large, since the direction of flow of oil entering the stator changes further, the first and second one-way clutches are both disengaged, the first and second stators both idle, and oil can flow out in a desired direction without interference from the blades of the first and second stators.

Since, with regard to the blade of the first stator, when viewed in the axis L direction, the blade tip part is inclined relative to the blade base part in the disengagement direction of the first one-way clutch, it is possible to ensure the blade area without increasing the dimension in the radial direction and the dimension in the axis L direction of the blade of the first stator, and it is possible, by smoothly guiding oil along the blade of the first stator to thus suppress the occurrence of a vortex, to reduce energy loss in a low speed ratio region.

Furthermore, in accordance with the second aspect of the present invention, when the first stator and the second stator are in predetermined phases, since the leading edge of one first stator intersects at least the leading edges of blades of two second stators, regardless of the relationship between the phases of the blade of the first stator and the blade of the second stator, the blade of the first stator is continuously connected to the blade of the second stator at two or more positions or at at least one position. This enables the state of flow between the blade of the first stator and the blade of the second stator to be made uniform in the circumferential direction, and the occurrence of variations in the torque ratio characteristics or the capacity coefficient characteristics of the torque converter to be minimized.

Moreover, in accordance with the third aspect of the present invention, when the span length of the blade of the first stator is smaller than the span length of the blade of the second stator, in a low speed ratio region a vortex easily occurs at the blade tip part of the blade of the first stator, but due to the blade of the first stator being inclined, the vortex can be reduced still more effectively.

EXPLANATION OF REFERENCE NUMERALS AND SYMBOLS

Figure 1:
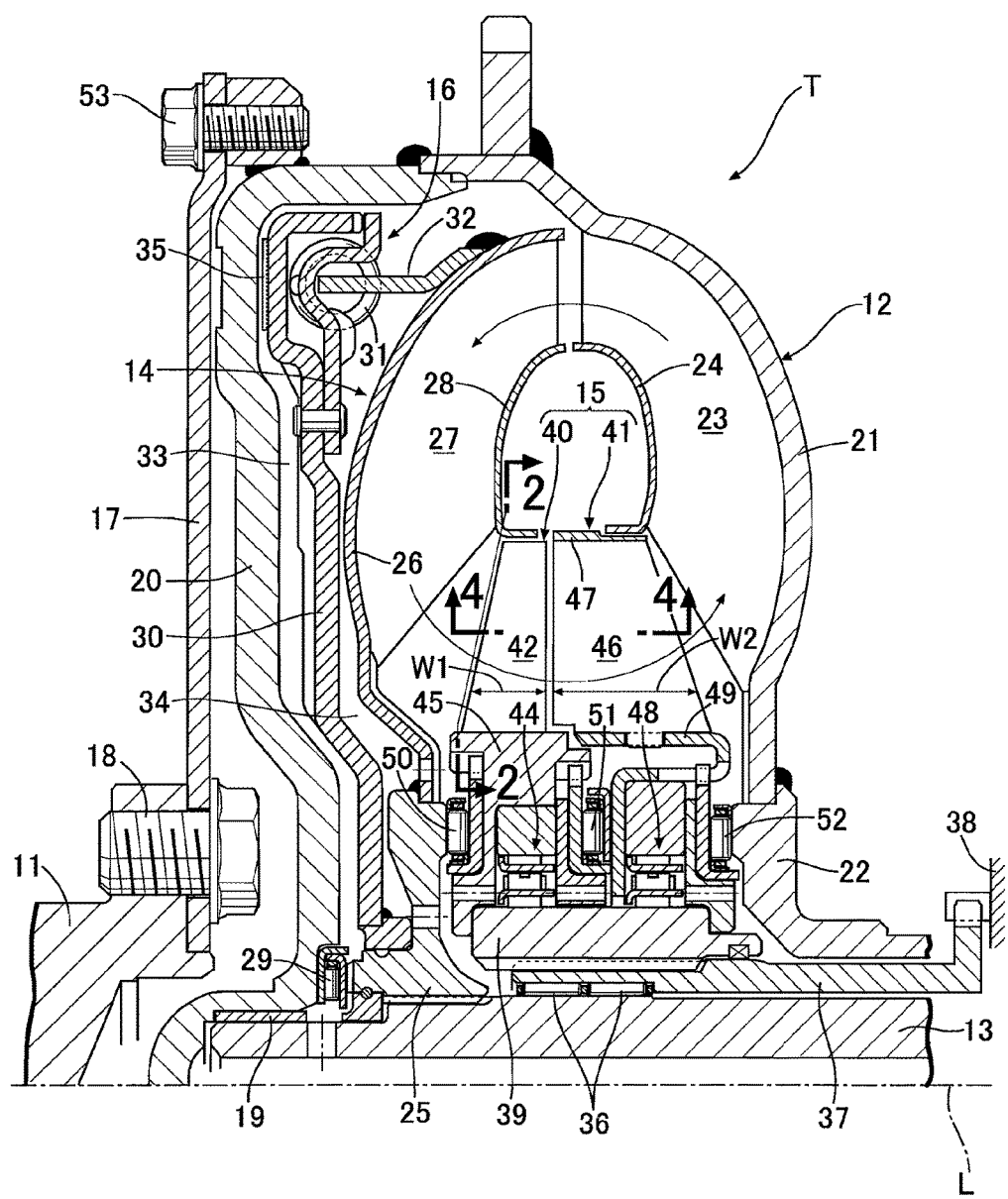
FIG. 1 is a vertical sectional view of a torque converter. (first embodiment)

12 Pump impeller
13 Main shaft (input shaft)
14 Turbine runner
15 Stator
38 Torque converter case (fixed part)
40 First stator
41 Second stator
42 First stator blade (blade of first stator)
42*a* Leading edge
44 First one-way clutch
46 Second stator blade (blade of second stator)
46*a* Leading edge
48 Second one-way clutch
L Axis

MODES FOR CARRYING OUT THE INVENTION

A first embodiment of the present invention is explained below by reference to FIG. 1 to FIG. 4.

First Embodiment

As shown in FIG. 1, a torque converter T for an automobile includes a pump impeller 12 that is connected to a crankshaft 11 of an engine (not illustrated) as a drive source, a turbine runner 14 that is connected to a main shaft 13 of a transmission (not illustrated), a stator 15 disposed between the pump impeller 12 and the turbine runner 14, and a lockup clutch 16 that can join the pump impeller 12 and the turbine runner 14. The crankshaft 11 and the main shaft 13 are coaxially disposed on an axis L of the torque converter T in a state in which shaft ends thereof oppose each other.

A plate-shaped drive plate 17 is fixed to the shaft end of the crankshaft 11 by means of bolts 18, and an outer peripheral part of the drive plate 17 is fixed, by means of bolts 53, to an outer peripheral part of a bowl-shaped torque converter cover 20 rotatably supported on the shaft end of the main shaft 13 via a plain bearing 19.

The pump impeller 12 is formed from a pump shell 21 that is welded to an outer peripheral part of the torque converter cover 20, a pump boss 22 that is welded to an inner peripheral part of the pump shell 21 and surrounds the outer periphery of the main shaft 13, a plurality of pump blades 23 that are projectingly provided on an inner face of the pump shell 21, and a pump core 24 that provides a connection between the extremities of the pump blades 23. The turbine runner 14 is formed from a turbine boss 25 that is spline joined to a shaft end part of the main shaft 13, a turbine shell 26 that is welded to the turbine boss 25, a plurality of turbine blades 27 that are projectingly provided on an inner face of the turbine shell 26, and a turbine core 28 that provides a connection between the extremities of the turbine blades 27. A thrust bearing 29 is disposed between the turbine boss 25 and the torque converter cover 20.

A space bounded by the pump shell 21 and the turbine shell 26 is filled with oil, and the oil circulates in the space in the direction shown by the arrows accompanying rotation of the pump impeller 12.

The lockup clutch 16 includes a clutch piston 30 that is fitted onto an outer peripheral part of the turbine boss 25 so that it can slide in the axis L direction, and an outer peripheral part of the clutch piston 30 is connected to the turbine shell 26 via damper springs 31 and stays 32. A first oil chamber 33 is defined between the clutch piston 30 and the torque converter cover 20, and a second oil chamber 34 is defined between the clutch piston 30 and the turbine shell 26.

Therefore, when an oil pressure is supplied to the first oil chamber 33, the clutch piston 30 moves rightward in the figure so as to make a friction member 35 be detached from the torque converter cover 20, and the pump impeller 12 and the turbine runner 14 are thereby separated so as to be relatively rotatable. On the other hand, when an oil pressure is supplied to the second oil chamber 34, the clutch piston 30 moves leftward in the figure so as to make the friction member 35 abut against the torque converter cover 20 and the lockup clutch 16 be engaged, and the pump impeller 12 and the turbine runner 14 are thereby integrally joined, thus transmitting rotation of the crankshaft 11 directly to the main shaft 13.

A sleeve 37 is relatively rotatably fitted onto the outer periphery of the main shaft 13 via needle bearings 36 and 36, one end part of the sleeve 37 is retained on a torque converter case 38, and a tubular stator support member 39 is spline joined to the outer periphery of the sleeve 37. Therefore, the stator support member 39 is non-rotatably restrained on the torque converter case 38 via the sleeve 37.

The stator 15 is formed from a first stator 40 that is positioned on the upstream side in the direction of circulation of oil shown by the arrows and a second stator 41 that is positioned on the downstream side, and the first and second stators 40 and 41 are arranged side by side in the axis L direction. The first stator 40 includes, at the radially inner end of a plurality of first stator blades 42, a first stator boss 45 that is supported on the stator support member 39 via a first one-way clutch 44. Furthermore, the second stator 41 includes, at the radially outer end of a plurality of second stator blades 46, a second stator core 47 that extends to the pump core 24 and includes, at the radially inner end of the plurality of second stator blades 46, a second stator boss 49 that is supported on the stator support member 39 via a second one-way clutch 48.

A thrust bearing 50 is disposed between the turbine boss 25 and the first stator boss 45, a thrust bearing 51 is disposed between the first stator boss 45 and the second stator boss 49, and a thrust bearing 52 is disposed between the pump boss 22 and the second stator boss 49.

When the pump impeller 12 connected to the crankshaft 11 of the engine rotates, oil that is pushed out in the arrowed direction from the pump blades 23 of the pump impeller 12 acts on the turbine blades 27 of the turbine runner 14, giving a torque to the turbine runner 14 so as to rotate the main shaft 13 of the transmission, then passes through the first and second stator blades 42 and 46 of the first and second stators 40 and 41 and returns to the pump impeller 12, thereby transmitting the rotation of the crankshaft 11 to the main shaft 13.

The specific structure of the first and second stators 40 and 41 is now explained by reference to FIG. 2 to FIG. 4.

With regard to the first stator 40, the first stator boss 45 and the first stator blades 42 are separately produced by press forming a metal plate, and they are assembled as a unit by welding. Therefore, the airfoil formed from a leading edge 42a, a trailing edge 42b, a ventral surface 42c, and a dorsal surface 42d of the first stator blade 42 has a flat plate shape having a constant blade thickness that is equal to the plate thickness of the metal plate.

The second stator 41 is a member that is made by die-casting, and a second stator core 47, a second stator boss 49, and second stator blades 46 are formed as a unit. The airfoil of the second stator blade 46 is formed from a leading edge 46a that has a large radius of curvature, a trailing edge 46b that has a small radius of curvature, and a ventral surface 46c and dorsal surface 46d that join the leading edge 46a and the trailing edge 46b. In the present embodiment, the number of first stator blades 42 coincides with the number of second stator blades 46.

The position of the blade end (radially outer end) of the first stator blade 42 coincides with the position of the blade end (radially outer end) of the second stator blade 46. Furthermore, a chord length W1 (distance from the leading edge 42a to the trailing edge 42b) of the first stator blade 42 is smaller than a chord length W2 (distance from the leading edge 46a to the trailing edge 46b) of the second stator blade 46 (see FIG. 1).

Furthermore, when viewed in the axis L direction, the second stator blades 46 of the second stator 41 extend radially toward the radially outer side with the axis L as the center, whereas the first stator blades 42 of the first stator 40 are inclined relative to the radial direction. Specifically, with regard to the first stator blades 42 of the first stator 40, the blade tip part is inclined relative to the blade base part so as to be biased in the idling direction of the first one-way clutch 44 (see arrow in FIG. 2). FIG. 2 and FIG. 3 show two states in which the difference in phase between first stator blades 42 and the second stator blades 46 is varied.

Figure 2:
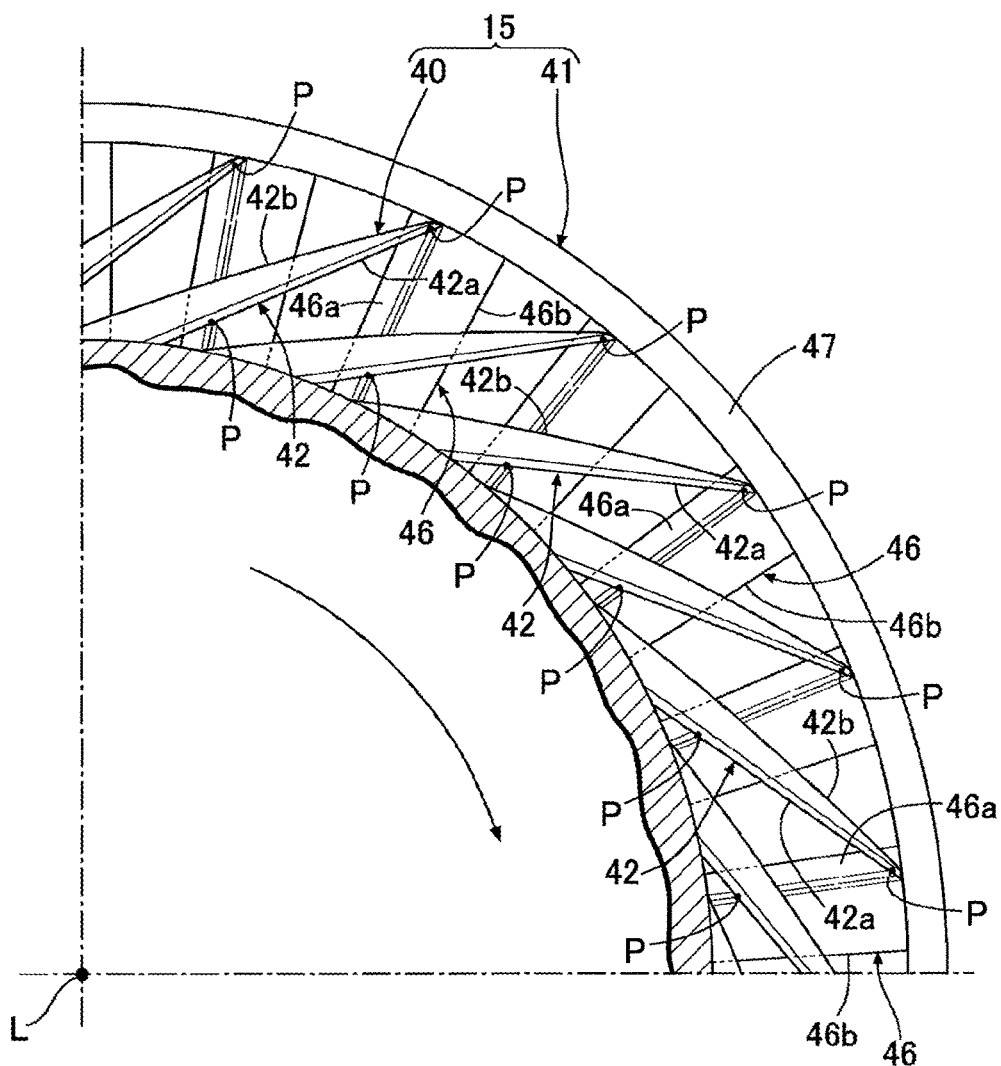
FIG. 2 is a sectional view along line 2-2 in FIG. 1. (first embodiment)
Figure 3:
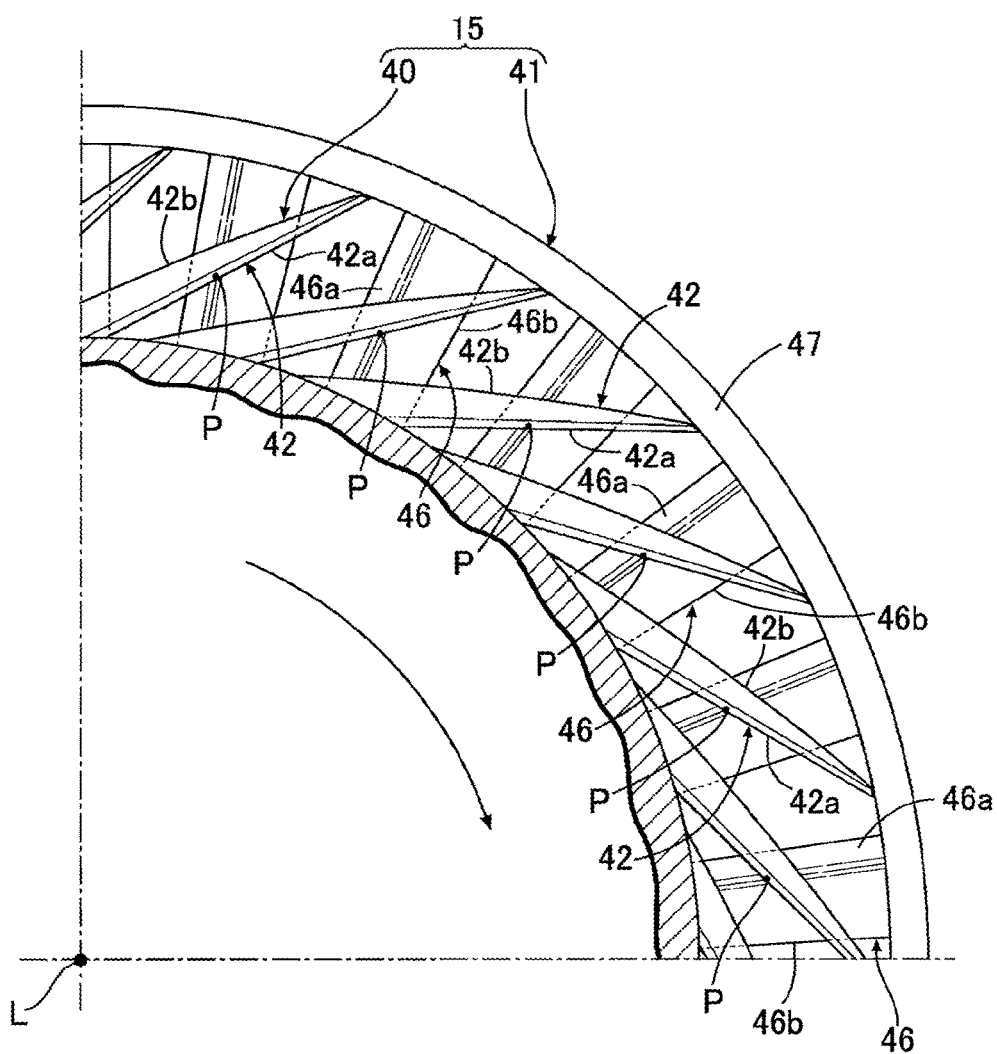
FIG. 3 is a view, corresponding to FIG. 2, showing a state in which the phase of a first stator is different. (first embodiment)
Figure 6:
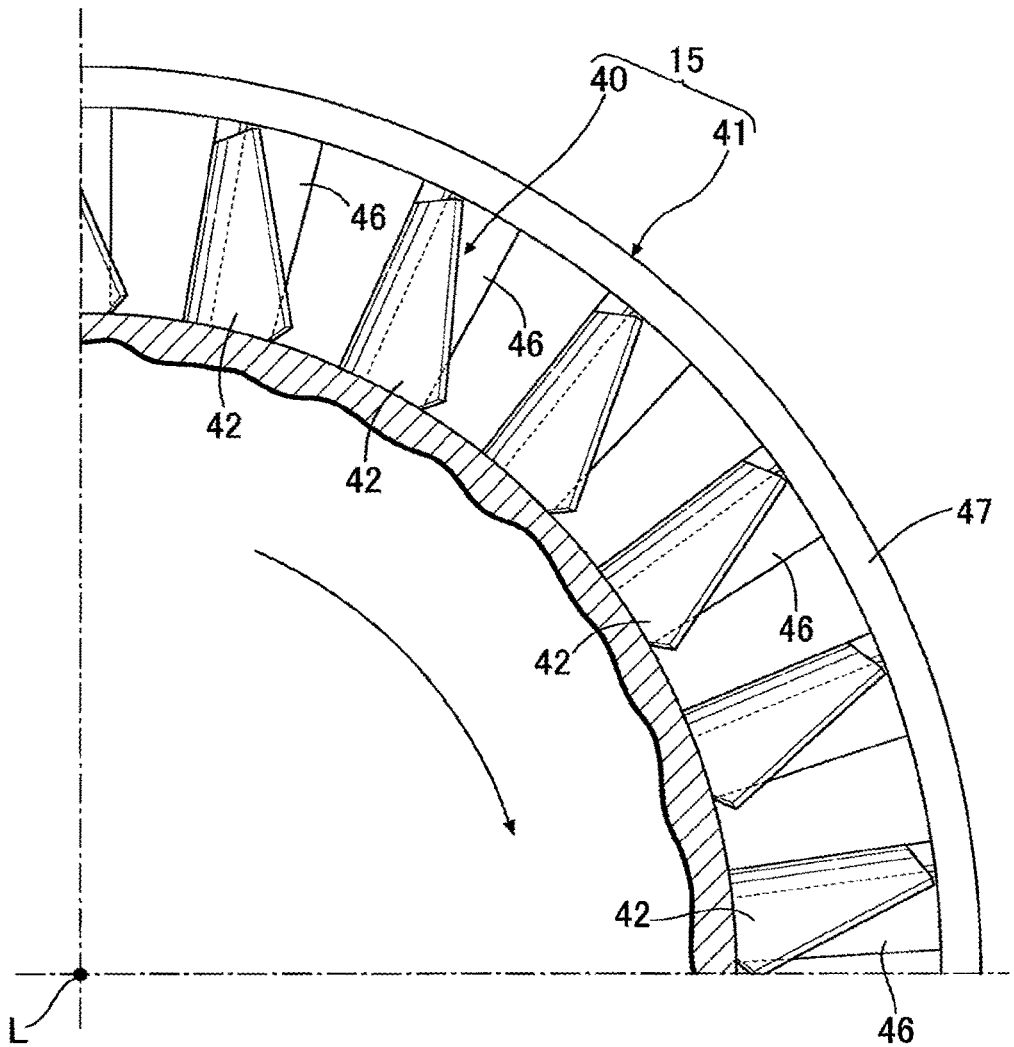
FIG. 6 is a view corresponding to FIG. 2. (conventional example)
Figure 7:
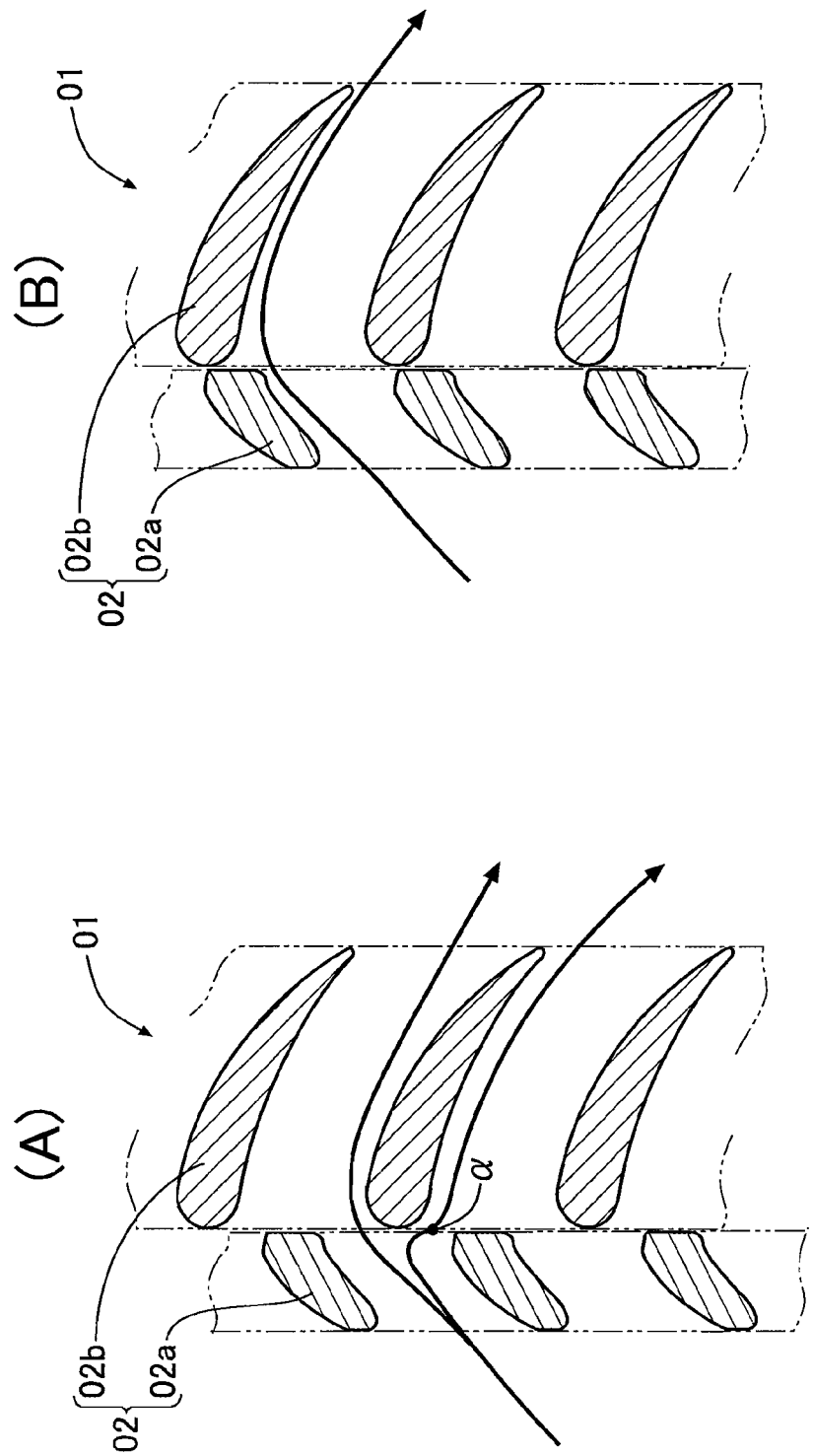
FIG. 7 is a diagram for explaining the flow around a stator blade of a conventional torque converter (two-stage stator). (conventional example)

FIG. 6 shows a conventional example corresponding to FIG. 2 and FIG. 3; first stator blades 42 of a first stator 40 are not inclined relative to the radial direction but extend radially toward the radially outer side with an axis L as the center.

The operation of the first embodiment of the present invention having the above arrangement is now explained.

Figure 4:
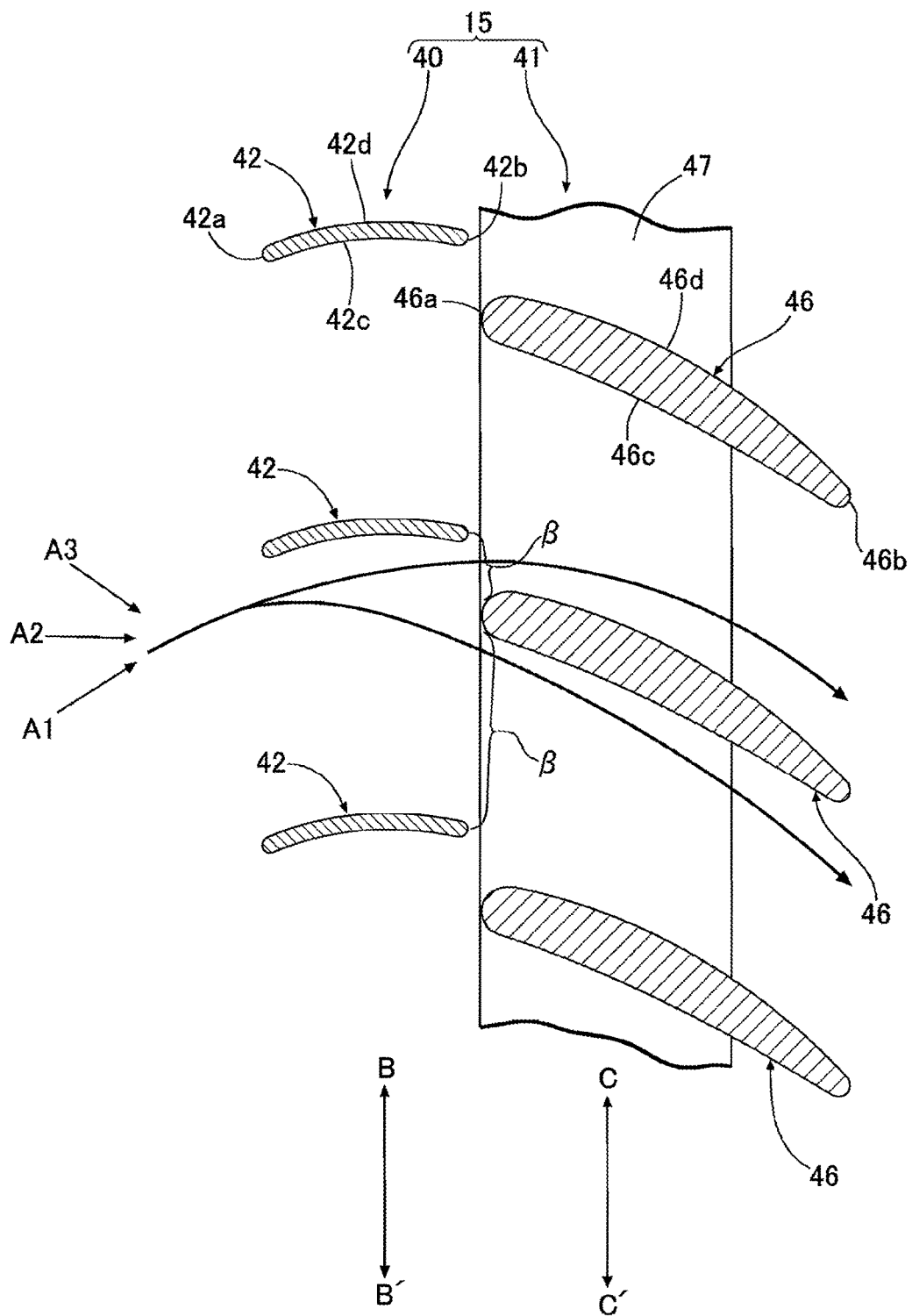
FIG. 4 is a sectional view along line 4-4 in FIG. 1. (first embodiment)

In a region where the speed ratio of the torque converter T is small, oil that has issued from the turbine runner 14 flows into the stator 15 from the direction of arrow A1 of FIG. 4, that is, in a direction along the camber line of the first stator blades 42 of the first stator 40. In this state, since the first stator blades 42 generate a lift in the direction of arrow B to engage the first one-way clutch 44, and the second stator blades 46 of the second stator 41 generate a lift in the direction of arrow C to engage the second one-way clutch 48, both the first stator 40 and the second stator 41 are non-rotatably restrained on the torque converter case 38. As a result, the direction in which oil flows out from the stator 15 deviates relative to the direction in which oil flows into the stator 15, and it becomes possible to make oil flow into the pump impeller 12, which is positioned on the downstream side thereof, at an appropriate angle.

When the speed ratio increases, since oil that has issued from the turbine runner 14 flows into the stator 15 from the direction of arrow A2 of FIG. 4, that is, from the dorsal surface 42d side of the first stator blades 42, there is a possibility that oil flow separation will occur on the ventral surface 42c side of the first stator blades 42, but the first one-way clutch 44 is disengaged due to the dorsal surfaces 42d of the first stator blades 42 being pushed by the flow of oil, and the first stator 40 thereby idles in the direction of arrow B'. As a result, stalling of the first stator blades 42 is suppressed, and oil flows smoothly in a direction along the camber line of the second stator blades 46.

In this state, since the second stator blades 46 of the second stator 41 still generate a lift in the arrow C direction to engage the second one-way clutch 48, and the second stator 41 is non-rotatably restrained on the torque converter case 38, oil whose flow has been aligned by the second stator 41 can be made to flow into the pump impeller 12, which is positioned on the downstream side, at an appropriate angle.

Since, when the speed ratio increases further, oil that has issued from the turbine runner 14 flows into the stator 15 from the direction of arrow A3 of FIG. 3, that is, from the dorsal surface 46d side of the second stator blades 46, there is a possibility that oil flow separation will occur on the ventral surface 46c side of the second stator blades 46, but the second one-way clutch 48 is disengaged due to the dorsal surfaces 46d of the second stator blades 46 being pushed by the flow of oil, and the second stator 41 idles together with the first stator 40 in the direction of arrow C'. As a result, stalling of the first stator blades 42 and the second stator blades 46 is suppressed, and oil that has passed through the stator 15 while being subjected to hardly any resistance flows into the pump impeller 12, which is positioned on the downstream side, at an appropriate angle.

As hereinbefore described, among the first and second stators 40 and 41, which are supported by the first and second one-way clutches 44 and 48 so that they can both idle, the first stator blades 42 of the first stator 40 have an airfoil that has an extremely small blade thickness and has a flat plate shape, and the second stator blades 46 of the second stator 41 have a closed airfoil that has a large blade thickness; it is therefore possible to ensure that there is a sufficiently large gap β (see FIG. 4) between the trailing edges 42b of the first stator blades 42 and the leading edges 46a of the second stator blades 46, thereby preventing the smooth flow of oil from being inhibited.

Furthermore, in accordance with the present embodiment, since the stator 15 is divided into the first stator 40 and the second stator 41, warpage of the second stator blades 46, which are made by die-casting, becomes small, and the structure of the die can be simplified by forming the second stator 41 as a unit by die-casting such that an undercut portion is not formed, thus reducing the production cost. Moreover, with regard to the first stator 40, the first stator blades 42 can also be produced simply by press forming, and the production cost can therefore be cut.

In a region in which the speed ratio of the torque converter T is small, there is the problem that oil that flows at high speed along an inner peripheral face of the turbine shell 26 covering the radially outer end of the turbine blades 27 flows into the first stator blades 42 of the first stator 40, the oil collides with the inner peripheral face of the first stator boss 45 of the first stator 40 and is deflected radially inwardly, and the oil that has flowed from the blade base side to the blade tip side of the first stator blades 42 forms a vortex at the blade tip part, thus causing energy loss.

In this process, if the first stator blades 42 had a sufficient blade area, it would be possible to suppress the flow of oil so as to be inward in the radial direction, direct the oil in the axis L direction, and pass it smoothly to the second stator blades 46, thus suppressing the occurrence of a vortex, but since the first stator blades 42 are made small in order to reduce the dimensions of the torque converter T, it would be difficult to give a sufficient blade area to the first stator blades 42, and there would be the problem that the occurrence of a vortex could not be suppressed.

However, in accordance with the present embodiment, since, with regard to the first stator blades 42 of the first stator 40, the blade tip part is inclined relative to the blade base part so as to be biased in the idling direction of the first one-way clutch 44 (see FIG. 2 and FIG. 3), it is possible to ensure the blade area for the first stator blades 42 without increasing the dimensions of the torque converter T, while suppressing the flow of oil inwardly in the radial direction to thus prevent the occurrence of a vortex, guide the oil in the axis L direction, and pass it to the second stator blades 46 smoothly, thereby reducing energy loss.

Figure 8:
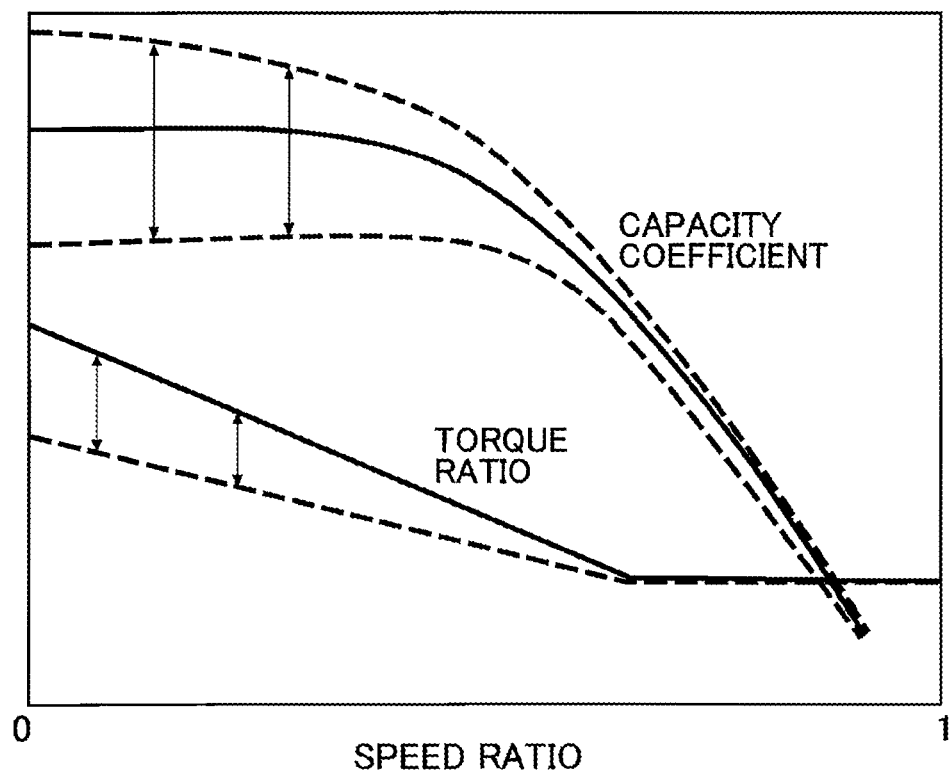
FIG. 8 is a graph showing torque ratio and capacity coefficient of a conventional torque converter (two-stage stator). (conventional example)

Moreover, when the first stator 40 and the second stator 41 are at the predetermined phases shown in FIG. 2, when viewed in the axis L direction the leading edge 42a of one first stator blade 42 intersects the leading edges 46a and 46a of two second stator blades 46 and 46 at two positions (see points P), and even when the first stator 40 and the second stator 41 are in a phase that is different from that in FIG. 2, the leading edge 42a of one first stator blade 42 intersects the leading edge 46a of one second stator blade 46 at one position (see point P). That is, regardless of the relationship between the phases of the first stator 40 and the second stator 41, each first stator blade 42 is continuously connected in the axis L direction to the second stator blade 46 at two positions or at at least one position. This enables the state of flow between the first stator blades 42 and the second stator blades 46 to be made uniform in the circumferential direction, the occurrence of variations in the torque ratio characteristics or the capacity coefficient characteristics of the torque converter T shown by the broken lines in FIG. 8 to be minimized, and the characteristics shown by the solid lines in FIG. 8 to be obtained.

Although it is possible to reduce variations in the torque ratio characteristics or the capacity coefficient characteristics by increasing the number of first stator blades 42, by so doing not only is there the problem that the number of components or the weight increases, but there is also a possibility that the flow path for oil between the trailing edges 42b of the first stator blades 42 and the leading edges 46a of the second stator blades 46 will become narrow, and it will become harder for oil to flow smoothly along the flow path, thus degrading the performance. However, in accordance with the present embodiment, since there is no need to increase the number of first stator blades 42, there is no possibility of the above problems occurring.

Figure 5:
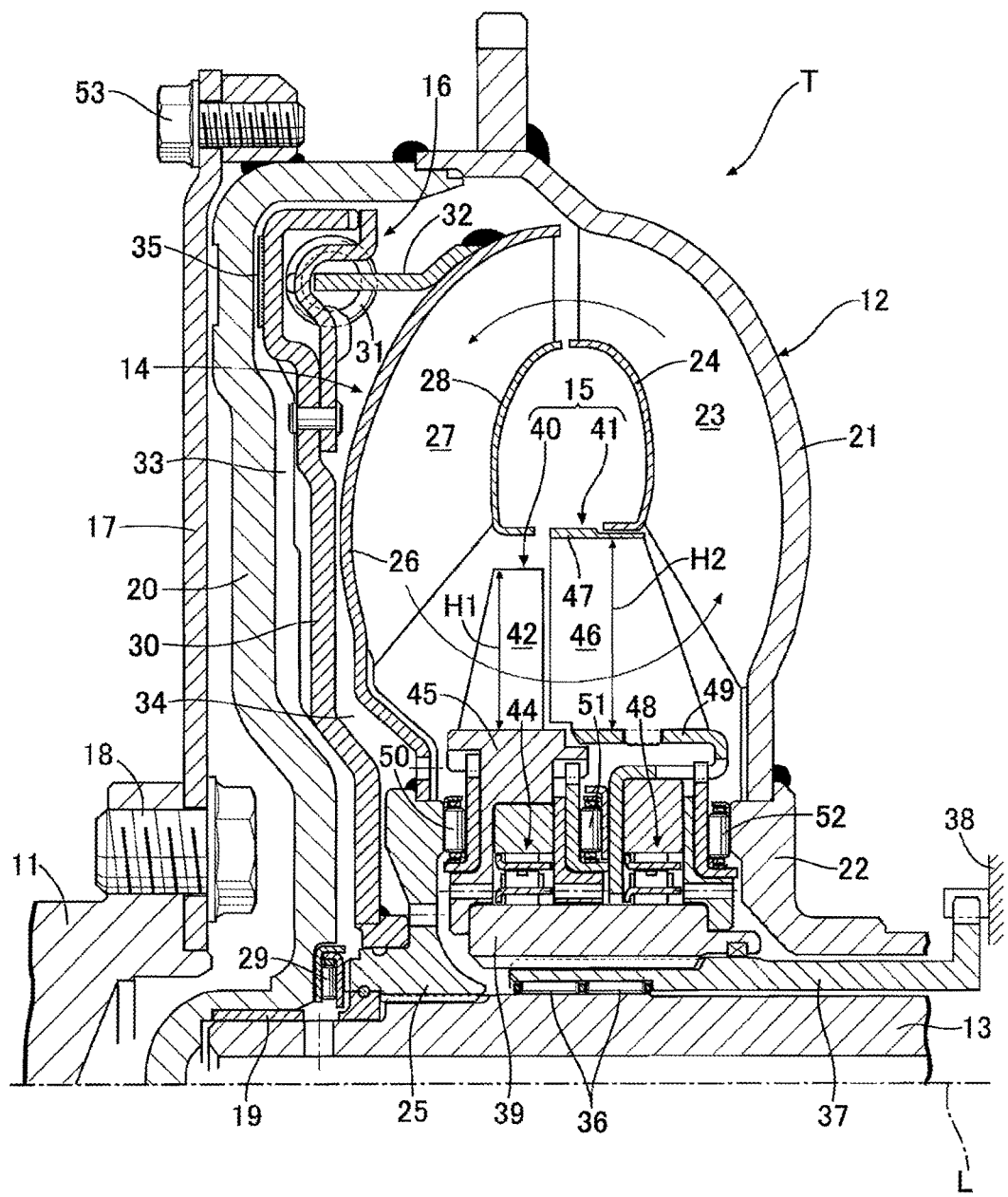
FIG. 5 is a vertical sectional view of a torque converter. (second embodiment)

A second embodiment of the present invention is explained below by reference to FIG. 5.

Second Embodiment

In the first embodiment, the position in the radial direction of the blade ends of the first stator blades 42 coincides with that of the second stator blades 46, but in a second embodiment a span length H1 of first stator blades 42 is shorter than a span length H2 of second stator blades 46, and the blade ends of the first stator blades 42 are positioned further toward the radially inner side than the blade ends of the second stator blades 46.

When it becomes necessary to employ such a dimensional relationship in order to reduce the dimensions of a torque converter T, the first stator blades 42 are made yet smaller, and the possibility of a vortex occurring at the blade tip part increases further, but it is possible, by making the first stator blades 42 be inclined in the idling direction of a first one-way clutch 44, to suppress effectively the occurrence of a vortex as in the first embodiment.

Embodiments of the present invention are explained above, but the present invention may be modified in a variety of ways as long as the modifications do not depart from the spirit and scope thereof.

For example, in the embodiment the number of first stator blades 42 coincides with the number of second stator blades 46, but it is not necessary for the numbers thereof to coincide with each other, and the number of first stator blades 42 may be larger or smaller than the number of second stator blades 46.

Furthermore, instead of producing the flat plate-shaped first stator blades 42 by pressing sheet metal, they may be produced by stereolithography.

The invention claimed is:

1. A torque converter comprising a pump impeller that is connected to a drive source and rotates around an axis, a turbine runner that is connected to an input shaft of a transmission and rotates around the axis, and a stator structure including a stator that is disposed between the pump impeller and the turbine runner, the stator comprising a first stator that is positioned on an upstream side in a direction of circulation of oil and a second stator that is positioned on a downstream side in the direction of circulation, the first stator being supported on a fixed part via a first one-way clutch, and the second stator being supported on the fixed part via a second one-way clutch, wherein the first stator includes a plurality of blades and the second stator includes a plurality of blades, and wherein in a view seen along the axis, a blade tip part of each of the blades of the first stator is inclined in a disengagement direction of the first one-way clutch relative to a blade base part and regardless of a relationship between phases of the first stator and the second stator, each of the blades of the first stator is continuously connected at least at one position to one of the blades of the second stator in a direction of the axis.

2. The torque converter according to claim 1, wherein a span length of the blade of the first stator is smaller than a span length of the blade of the second stator.

* * * * *